(12) United States Patent
Bushroe et al.

(10) Patent No.: US 7,772,520 B2
(45) Date of Patent: Aug. 10, 2010

(54) HAND-HELD LASER CUTTING APPARATUS AND METHOD USING SAME

(75) Inventors: Frederick N. Bushroe, Tucson, AZ (US); Mohamed H. Khan, Tuscon, AZ (US); Craig T. Walters, Powell, OH (US)

(73) Assignee: Climax Molybdenum Company, Phoenix, AZ (US)

( * ) Notice: Subject to any disclaimer, the term of this patent is extended or adjusted under 35 U.S.C. 154(b) by 1086 days.

(21) Appl. No.: 11/178,010

(22) Filed: Jul. 8, 2005

(65) Prior Publication Data

US 2007/0010069 A1 Jan. 11, 2007

(51) Int. Cl.
*B23K 26/38* (2006.01)

(52) U.S. Cl. .............................. 219/121.67; 219/121.7; 219/121.84

(58) Field of Classification Search ................................. 219/121.63–121.72, 121.84
See application file for complete search history.

(56) References Cited

U.S. PATENT DOCUMENTS

| 4,237,364 | A | * | 12/1980 | Lemelson | 219/121.63 |
|---|---|---|---|---|---|
| 4,461,947 | A | * | 7/1984 | Ward | 219/121.84 |
| 4,467,311 | A | * | 8/1984 | Person et al. | 338/293 |
| 4,492,843 | A | * | 1/1985 | Miller et al. | 219/121.63 |
| 4,564,736 | A | * | 1/1986 | Jones et al. | 219/121.6 |
| 4,673,795 | A | * | 6/1987 | Ortiz, Jr. | 219/121.6 |
| 5,022,041 | A | * | 6/1991 | Jacobs | 372/70 |
| 5,155,323 | A | * | 10/1992 | Macken | 219/121.64 |
| 5,180,378 | A | * | 1/1993 | Kung et al. | 606/10 |
| 5,401,272 | A | * | 3/1995 | Perkins | 606/15 |
| 5,616,261 | A | * | 4/1997 | Forrest | 219/121.63 |
| 5,780,806 | A | * | 7/1998 | Ferguson et al. | 219/121.68 |
| 5,897,796 | A | * | 4/1999 | Forrest | 219/121.64 |
| 6,306,160 | B1 | * | 10/2001 | Nidetzky | 607/89 |
| 6,488,696 | B1 | * | 12/2002 | Cho et al. | 607/89 |
| 6,538,231 | B2 | * | 3/2003 | Karube et al. | 219/121.76 |
| 6,804,269 | B2 | * | 10/2004 | Lizotte et al. | 372/9 |

FOREIGN PATENT DOCUMENTS

| DE | 10206008 A1 | * | 8/2003 |
|---|---|---|---|
| EP | 0392951 A | * | 10/1990 |
| JP | 04237585 A | * | 8/1992 |
| WO | WO0071044 A1 | * | 11/2000 |

* cited by examiner

*Primary Examiner*—Samuel M Heinrich
(74) *Attorney, Agent, or Firm*—Dale F. Regelman; Quarles & Brady LLP

(57) ABSTRACT

A hand-held apparatus is disclosed, where that hand-held apparatus comprises a hand piece having an output end, a switch disposed on that hand piece, wherein that switch includes "on" position and an "off" position, and wherein a laser beam is directed outwardly from the output end of the hand piece when the switch is disposed in the "on" position. In certain embodiments, a lasing device is disposed within the hand piece. In other embodiments, a lasing device is disposed external to the hand piece, wherein that lasing device is interconnected with the hand piece by a fiber optic cable.

13 Claims, 16 Drawing Sheets

FIG. 2

| PROPERTY (units) | SYMBOL | VALUE |
|---|---|---|
| DENSITY (g/cm$^3$) |  | 7.9 |
| THERMAL CONDUCTIVITY (W/cm K) | $k$ | 0.40 |
| AVERAGE SPECIFIC HEAT (J/g K) | $C_p$ | 0.88 |
| THERMAL DIFFUSIVITY (cm$^2$/s) | $= k/(\ C_p)$ | 0.058 |
| LASER BEAM ABSORPTANCE (1064 nm) | $\alpha$ | 0.33 |
| MELTING POINT (K) | $T_m$ | 1800 |
| BOILING POINT (K) | $T_b$ | 3300 |
| HEAT OF VAPORIZATION (J/g) | $H_v$ | 4700 |
| MOLECULAR WEIGHT (g/mole) | $M$ | 56 |
| SURFACE TENSION OF THE LIQUID (dyne/cm) | $S$ | 500 |

ND-HELD LASER CUTTING APPARATUS
AND METHOD USING SAME

FIELD OF THE INVENTION

The invention described and claimed herein relates to a hand-held laser cutting apparatus, and method using that apparatus.

BACKGROUND OF THE INVENTION

Drilling holes was one of the first applications for lasers and continues to be an important niche application in industry. A typical example is the drilling of cooling holes in jet engine turbine blades. Prior art laser devices used to form holes in metallic substrates comprise large, non-portable assemblies. In addition, prior art methods using such non-portable laser devices generally include continuous operation at power levels exceeding 1000 Watts.

What is needed is a hand-held apparatus which directs a laser beam onto a work surface. Such a device could be used as a hand-held cutting tool, and/or as a hand-held drill. Applicants' invention comprises a hand-held apparatus from which a laser beam can be directed onto a work surface.

SUMMARY OF THE INVENTION

Applicants' invention comprises a hand-held apparatus for the purpose of cutting and/or drilling of materials (in general, material removal), where that hand-held apparatus comprises a hand piece having an output end, a switch disposed on said hand piece, having an "on" position and an "off" position, wherein a laser beam is directed outwardly from the output end of the hand piece when the switch is disposed in the "on" position. In certain embodiments, a lasing device is disposed within the hand piece. In other embodiments, a lasing device is disposed external to the hand piece, wherein that lasing device is interconnected with the hand piece by a fiber optic cable.

BRIEF DESCRIPTION OF THE DRAWINGS

The invention will be better understood from a reading of the following detailed description taken in conjunction with the drawings in which like reference designators are used to designate like elements, and in which:

FIG. 2 is a table reciting the thermophysical properties of C1018 steel;

DETAILED DESCRIPTION OF THE PREFERRED EMBODIMENTS

Applicants' invention comprises a hand-held apparatus from which a laser beam can be directed onto a work surface to perform a variety of cutting operations, drilling operations, material removal operations, machining operations, and the like (collectively "fabrication operations"). This invention is described in preferred embodiments in the following description with reference to the Figures, in which like numbers represent the same or similar elements.

In order to determine the most effective modes of operation for the lasing component of Applicants' apparatus, Applicants used a variety of laser devices to cut C1018 steel coupons. The following description of Applicant's apparatus and method is not meant, however, to limit Applicant's invention to cutting or forming holes in either C1018 steel or steel in general, as the invention herein can be use to perform fabrication operations on a wide variety of substrate materials.

Figure 1:
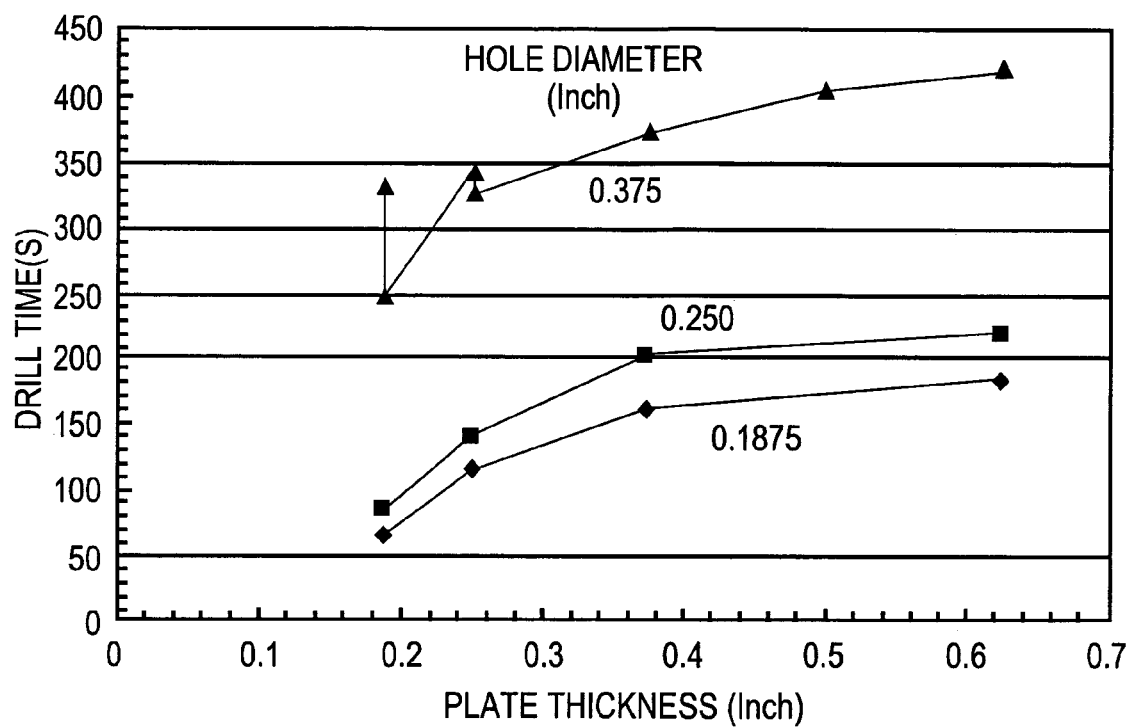
FIG. 1 graphically recites drill rates using a conventional hand-held mechanical drilling apparatus.

As those skilled in the art will appreciate, drilling holes in metallic substrates using a hand-held drilling apparatus is both time-consuming and laborious. In that regard, FIG. 1 graphically depicts data regarding the total drilling time required to form holes of various diameters in C018 steel plate of various thicknesses using a conventional hand-held, cordless drill. In this study, Applicants concluded that drilling a 0.5 inch diameter hole in 0.375 inch thick steel plate using a 0.50 inch diameter drill bit in combination with a hand-held, cordless drill would require more than 500 seconds. Applicants further concluded that drilling a 0.5 inch diameter hole in 0.375 inch thick steel plate using a 0.50 inch diameter drill bit in combination with a hand-held, corded drill would require more than 200 seconds.

Figure 3:
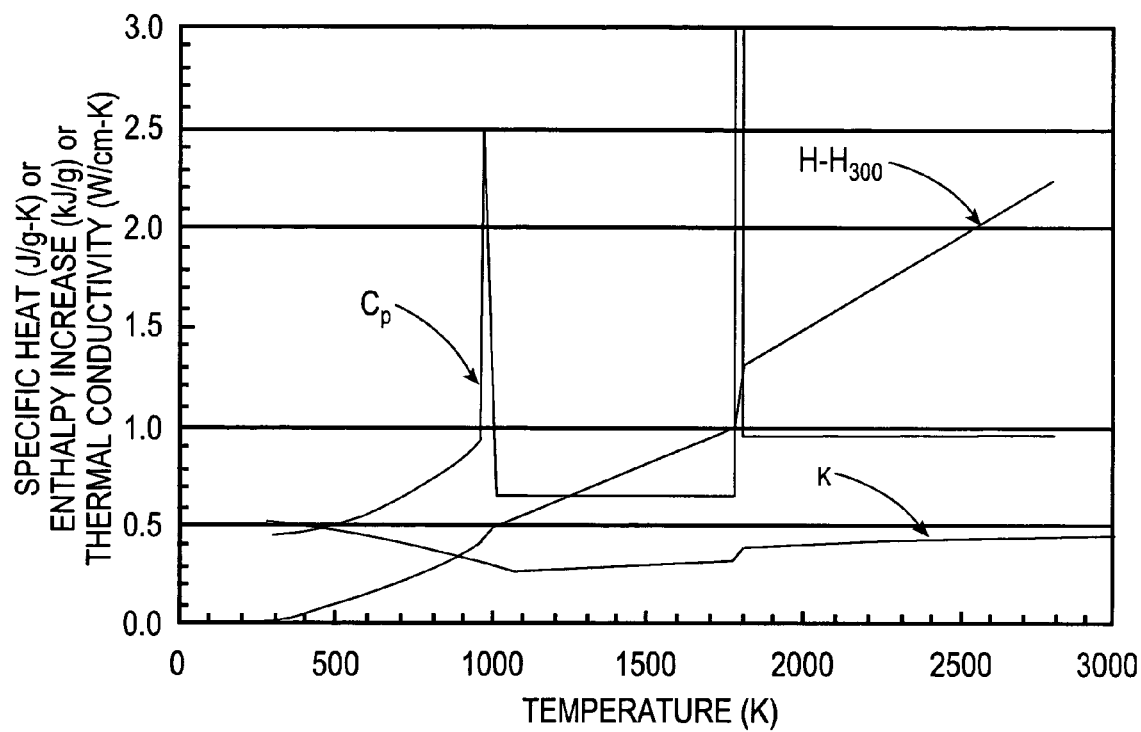
FIG. 3 graphically depicts the temperature dependence of thermal properties of C1018 steel.

FIG. 2 recites certain thermophysical properties of C1018 steel. FIG. 3 graphically depicts certain thermal properties of C1018 steel. Using the data of FIGS. 2 and 3, Applicants determined that disposing a 0.50 inch diameter hole in 0.375 inch thick steel in about 200 seconds requires a laser beam having an average power in the range of 25-180 W, or 5-36 kJ.

Laser drilling with a pulsed laser typically employs a Nd:glass or Nd:YAG gain medium with normal mode operation (no q-switch), although any suitable laser type may be used. The laser pulse energy may be in the 1-10 J range with pulse width in the range of 0.2 to 2 ms. This leads to peak powers of the order of 5-10 kW and peak irradiance values of the order of 2-5 MW/cm$^2$ for a 0.5-mm diameter beam spot on a surface.

Figure 4:
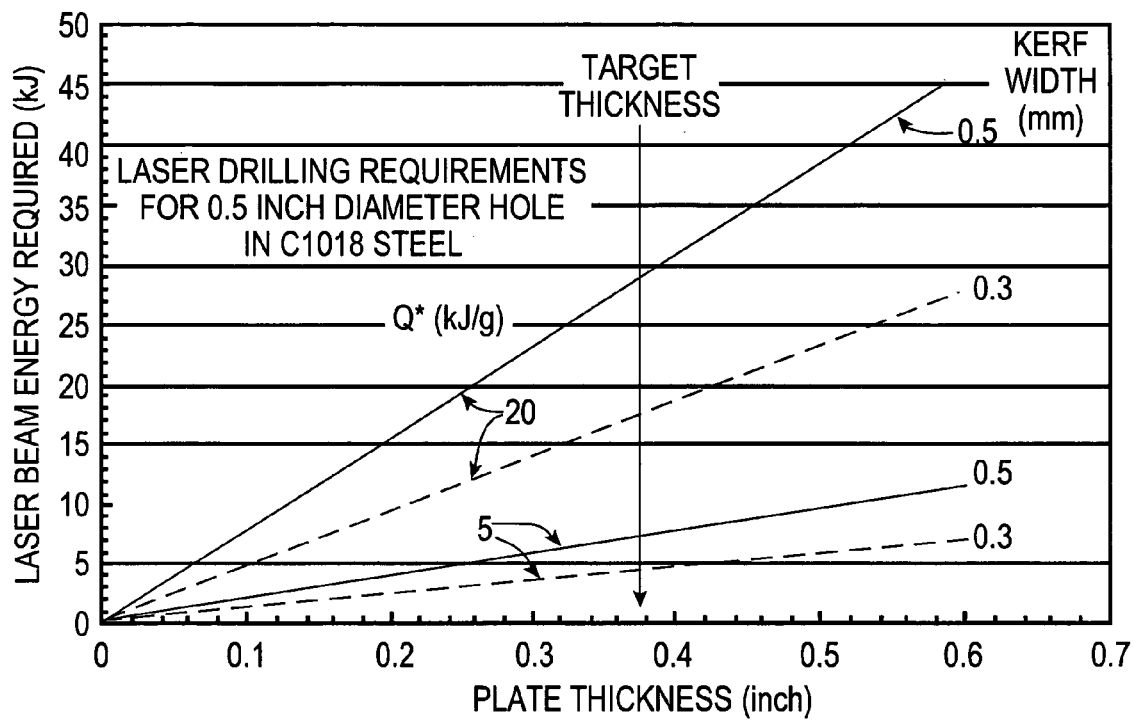
FIG. 4 graphically depicts the calculated laser energy required to drill a 0.5 inch diameter hole in C1018 steel.

The drilling mechanism for steel under these conditions would include rapid establishment of a hot melt layer on the surface followed by some evaporation of the melt. The backpressure on the melt layer from the expanding vapor pushes it out radially and ejects it from the hole. FIG. 4 graphically depicts Applicants' calculations regarding the laser beam energy required to drill a 0.5 mm diameter hole in C1018 steel by trepanning.

The holes drilled by this method will leave some resolidified melt (recast) around the hole and some heat-affected zone in the metal. Longer pulses lead to thicker melt layers and deeper heat-affected zones, however the longer pulses are more energy efficient in drilling because less energy is invested in the heat of vaporization. Shorter pulses may be obtained with the same solid-state lasers by q-switching the laser oscillator. Q-switched pulses have pulse widths in the range of 10 to 300 ns depending on q-switch type and laser operating parameters.

If the laser beam absorbance is about 0.33 (typical for steel) and is constant over the temperature range of interest, then the incident energy requirement can be calculated to be about 6 kJ/g of mass removed. Such an energy level/unit of mass is sometimes referred to as the effective heat of ablation or "effective heat of mass removal" and is usually designated by the symbol Q*.

In order to determines actual values for the energy required, Applicants utilized small coupons of the materials of interest for their laser cutting tests. The primary material of interest was C1018 steel. The testing was conducted with C1018 steel coupons (1.5 inch×1.0 inch×0.375 inch). The coupons were designed to have a mass less than 100 g so that they could be weighed on a Mettler AE-100 microbalance before and after each test to determine mass loss.

The thickness of the sample was set by the goal to be able to cut through 0.375-inch steel using Applicants' portable, hand-held apparatus. Secondary materials of interest included ceramic tile, slate, cement, granite, brick, wallboard, and wood. A limited number of coupons of these materials were prepared with mass less than 100 g. These materials were tested after the best laser parameters for cutting steel were determined. Table I presents a listing of the materials tested and densities determined by measurements.

TABLE I

Materials used in cutting laser tests

| Material Code | Material | Density (g/cm³) |
| --- | --- | --- |
| ST | CI018 Steel | 7.86 |
| CT | Ceramic Tile | 2.57 |
| QC | Cement (Quickrete) | 1.94 |
| GM | Granite (multi-color) | 2.59 |
| SJ | Slate (jade green) | 2.53 |
| TC | Terra Cotta Tile (brick- | 2.62 |
| WP | Wood (poplar) | 0.51 |
| WB | Wall Board | 0.61 |

In studying short pulse cutting times, Applicants utilized a Spectra Physics Tornado TN-50 laser device. The TN-50 is a diode-pumped Nd:YAG laser with an acousto-optic q-switch. The diodes are run continuously and the q-switch is operated at frequencies ranging from 1 to 50 kHz. The pulse width varies with pulse repetition rate as shown in FIG. 5.A As those skilled in the art will appreciate, many solid-state lasers use neodymium (Nd) doped materials such as Nd:YAG (Yttrium Aluminum Garnet which is $Y_3Al_5O_{12}$), Nd:YVO$_4$, Nd:Glass, and others. These have a much lower lasing threshold than ruby as well as other desirable physical and optical properties. The strongest output wavelength of neodymium doped lasers is around 1,064 nm-near-IR and totally invisible.

Many other laser types may be suitable for handheld laser fabrication of materials, however, solid-state lasers are generally favorable for their simplicity and compactness. Solid-state lasing media might include a wide variety rare-earth oxides doped in crystals, glass, ceramic, and other hosts.

Figure 5A:
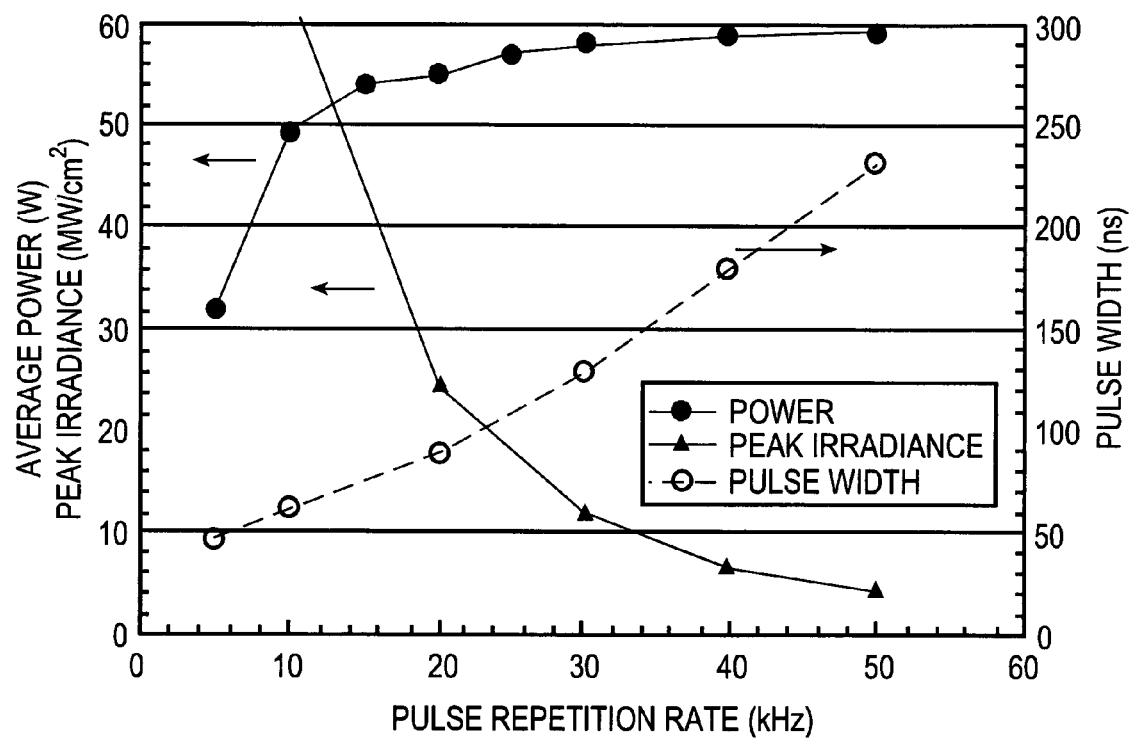
FIG. 5A graphically depicts certain measured parameters for a Spectra Physics TN-50 laser.
Figure 5B:
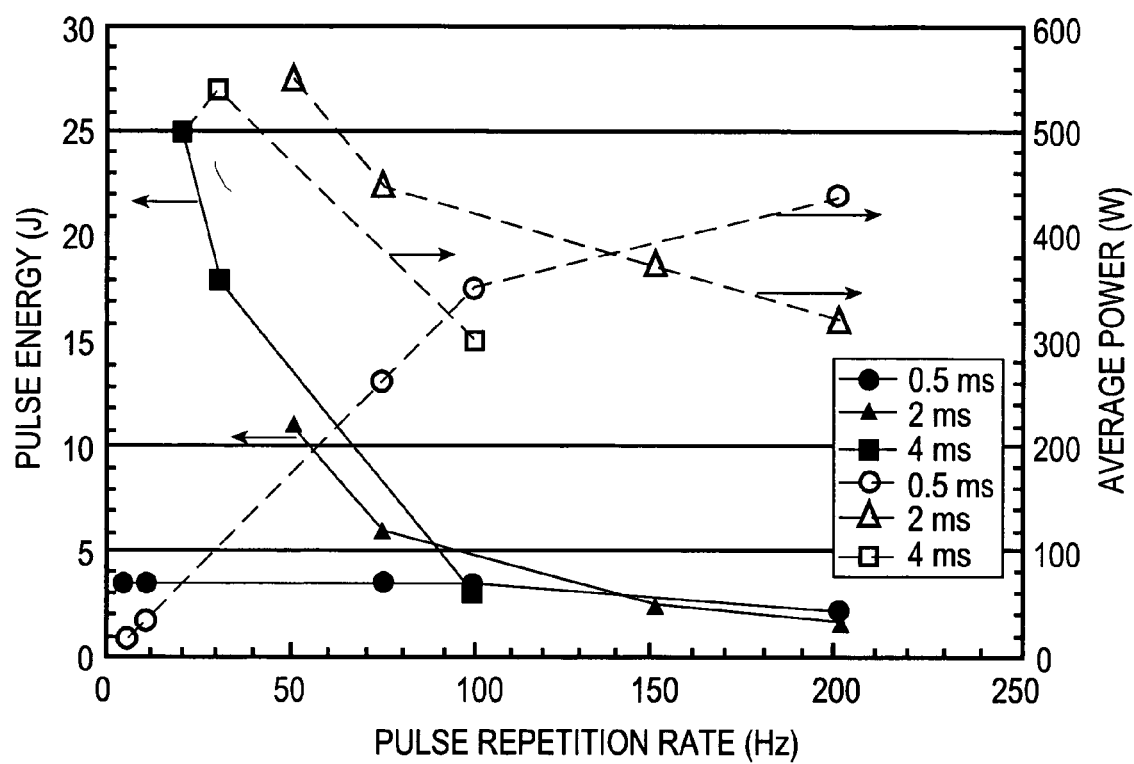
FIG. 5B graphically depicts certain measured parameters for a Lumonics JK701H laser.

The data points recited in FIG. 5A were obtained in calibration measurements using the TN-50. Average power was measured with a Coherent Model 200 XI power meter with a Field-Master GS readout. The pulse width was measured with a Thorlabs DET 210 photo diode and a Tektronix TDS320 oscilloscope. As the interval between q-switch firings is reduced (increased pulse repetition rate), there is less time to build a population inversion in the laser crystal. This leads to lower energy per pulse and a slower release of energy, although the average laser power remains relatively constant. The net result is that peak power in a pulse varies widely with pulse repetition rate. This is shown in FIG. 5A by the curve with triangular symbols, which graph the estimated peak irradiance on the steel surface assuming a 0.4 mm spot diameter. At 5 kHz, the estimated peak irradiance would be greater than 100 MW/cm$^2$, which is the estimated irradiance threshold for absorbing plasma formation. Plasma formation would limit the effectiveness of the laser beam at removing material.

An aluminum plate was placed behind the focal plane where it scattered light to a photodiode receiver optics package which transmitted light to the photodiode by fiber optic to measure laser beam pulse width. Average power readings were performed with the aluminum plate removed so that the power meter could receive the beam. Laser exposure of the steel coupons with the TN-50 laser beam were accomplished by placing the coupon in a vice with the face of the coupon at the focal plane of a 50-mm focal length lens assembly.

A nozzle was used to provide air flow for some of the tests to blow the effluent plume out of the laser beam path. The vice was mounted on translation stages that provided linear scanning of the sample under the beam to make a cut along a straight track line and provided lateral motion for movement to different track locations on the sample.

In studying long pulse cutting tests, Applicants utilized a Lumonics JK701H laser fitted with a 1.0 mm core multimode fiber for beam delivery. The fiber optic was inserted in a standard collimator/focusing package which provided a 0.5 mm diameter beam spot on the surface of the coupons. The package employed a 160-mm focal length collimator and an 80-mm focusing lens. The beam parameters for the laser are presented in FIG. 5B as determined from initial factory calibration records. These values do not account for losses in launching the beam into the fiber optic or for losses in the beam delivery optical system. These losses were determined by calibration measurements.

To calibrate pulse width and power for the JK701H, a tilted aluminum plate scattered light into the photo diode receiver for a pulse width measurement as in the calibration of the TN-50. To measure power, the aluminum plate was replaced by the Coherent Model 200 XI power meter head.

Figure 6:
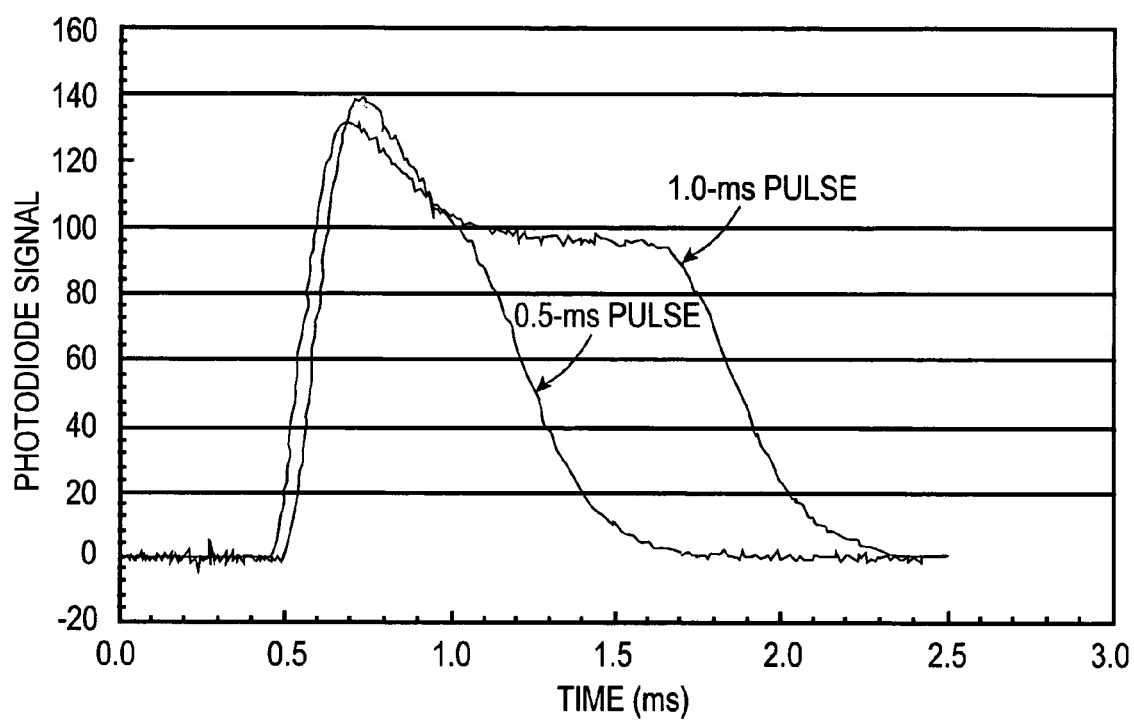
FIG. 6 graphically depicts pulse temporal profiles for the JK701H laser.

Readings on the Model 200 power meter were recorded simultaneously with readings obtained from the laser internal power meter. For power levels over 200 W, an Optical Engineering Power Puck P500 was used in place of the Model 200. These measurements showed that the average power reaching a work surface was 0.826±0.002 times the laser internal power meter reading. Power levels reported are calculated values at the work surface. Temporal profiles for the JK701H laser are presented in FIG. 6.

Short Pulse Steel Cutting Results

A series of partial penetration cuts in the C1018 steel coupons were made with the TN-50 laser by translating the coupon under the focused beam at various translation rates in the range of 1 to 10 mm/s. In the short pulse mode (50-250 ns), the beam interaction with the steel is dominated by vaporization, wherein the ablation wave moves into the material faster than the thermal conduction wave. As a result, there was very little melted material in the effluent plume.

Figure 7:
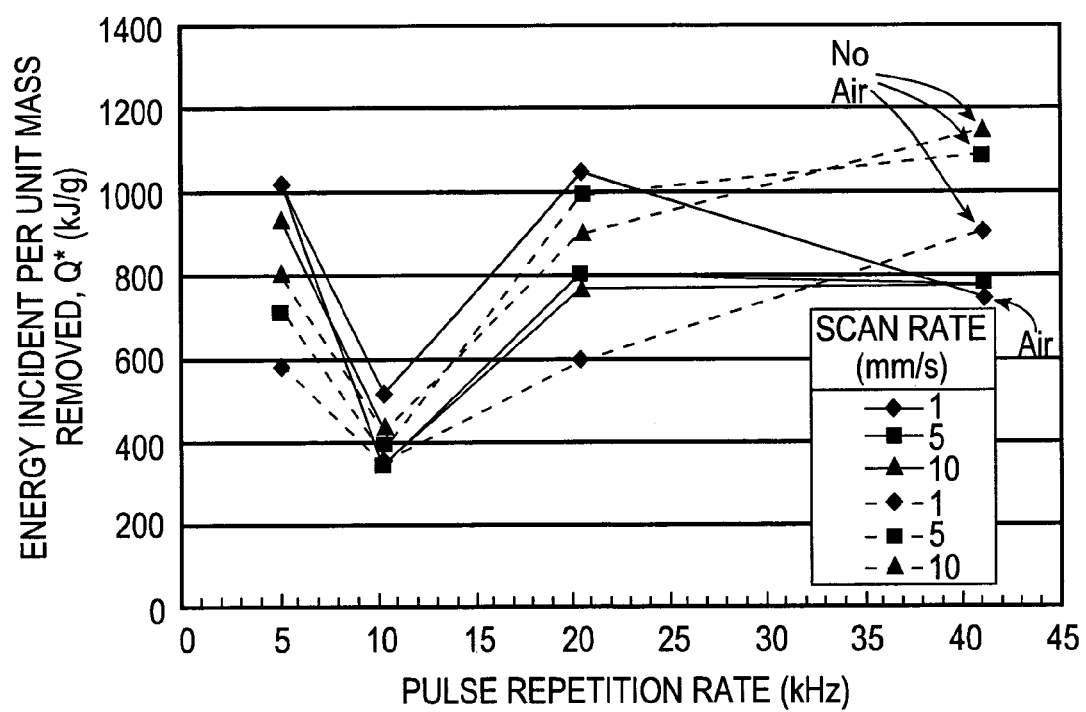
FIG. 7 graphically depicts Q* data derived from short pulse laser cutting of C1018 steel.

Referring now to FIG. 7, the data are presented in terms of Q* (kJ/g), which is simply the energy in kJ required to remove one gram of material. The energy was determined from the laser power and run time, while the mass of material removed in the cut was determined by measuring the coupon mass before and after a test. The data show that the best condition (lowest Q*) for cutting with this laser was near 10 kHz pulse repetition rate. The pulse width for this condition was about 60 ns and the peak irradiance was about 60 MW/cm$^2$.

Apparently, an absorbing plasma was formed in the plume for the shorter pulse width at 5 kHz which had an estimated peak irradiance of over 100 MW/cm$^2$. This led to the increase in Q* as pulse repetition rate was reduced to 5 kHz.

Long Pulse Steel Cutting Results

Applicants conducted a series of laser exposures of steel coupons with the JK701H laser using a linear scanning approach similar to that used for short pulses. In the initial tests, an air knife was positioned to deflect the molten ejected steel from the laser interaction to minimize material deposition on the lens protector plate positioned just under the focusing lens. The air knife was effective in deflecting slow moving ejecta.

Figure 8:
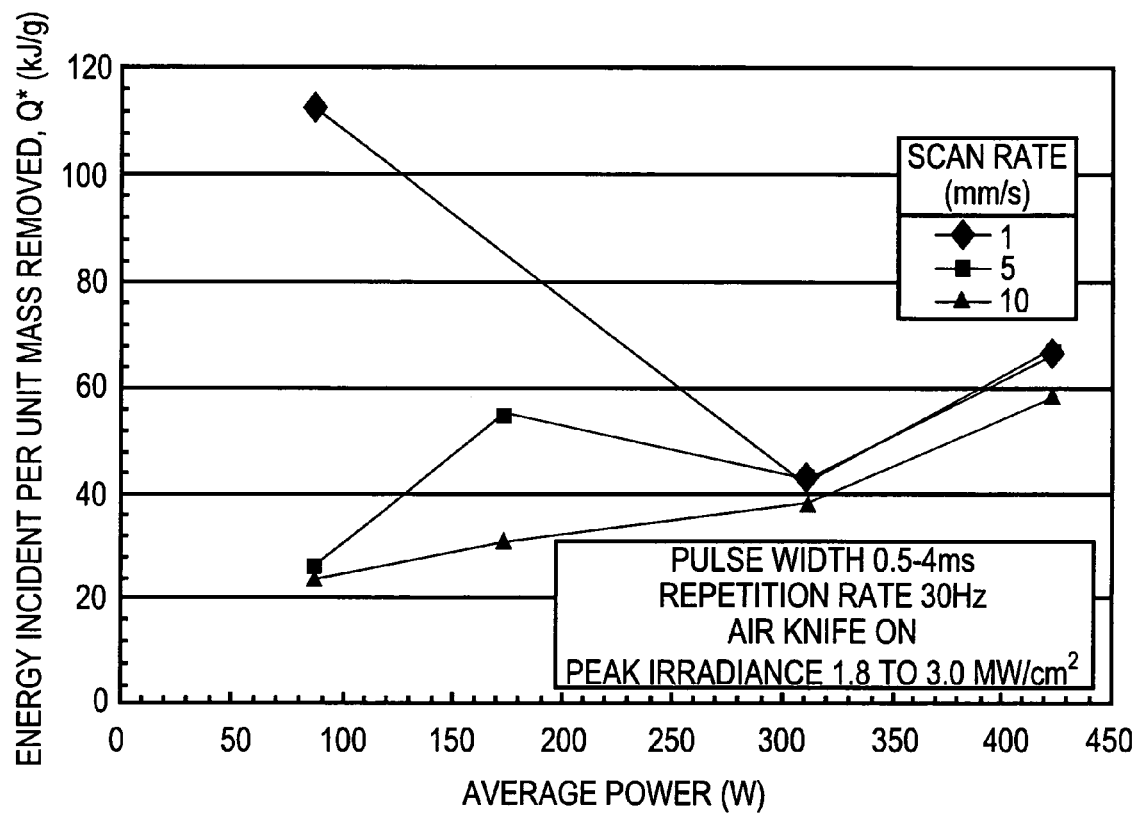
FIG. 8 graphically depicts Q* data derived from long pulse cutting of C1018 steel.

The pulse widths used for these tests (0.5-4.0 ms) were sufficiently long that the thermal conduction wave moving into the material was not overtaken by the ablation front and a melt dominated interaction resulted. The peak irradiance in each pulse was typically only slightly greater than the threshold for vaporization and ablation of the steel. The backpressure from the vaporization was responsible for pushing molten material out of the developing kerf. The air knife played no role in material removal. Removal of un-vaporized material led to more efficient cutting than seen with short pulses. FIG. 8 graphically depicts Q* data for steel cutting with pulses in the 0.5-4.0 ms range.

In Applicants' long pulse cutting study, the pulse repetition rate was held constant at 30 Hz and the pulse width increased with increasing average power. The scan rate was varied from 1 to 10 mm/s and the number of passes on one track was varied correspondingly to provide approximately the same total cutting time for each scan rate. Except for one data point, the Q* values were found to be fairly low compared to the short pulse values and relatively insensitive to scan rate at the higher average power levels. The higher Q* values at high average power were believed to result from the lower peak irradiance which was very near the threshold value for vaporization.

Figure 9:
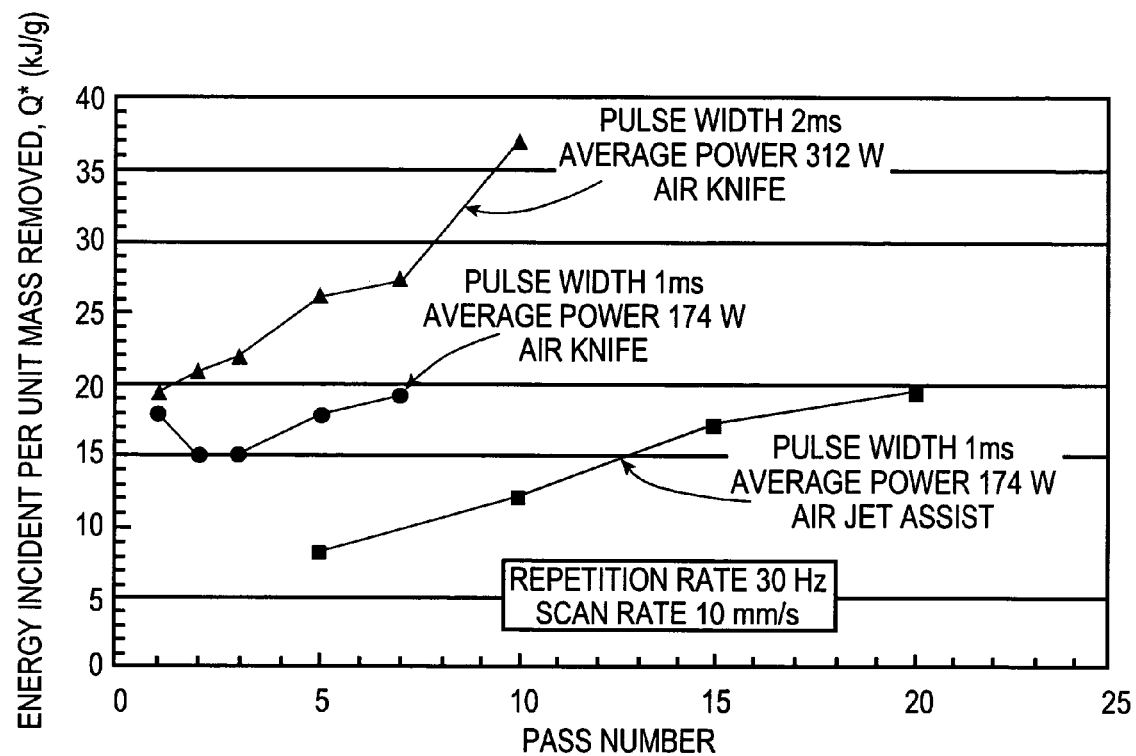
FIG. 9 graphically depicts Q* data derived from long pulse cutting of C1018 steel using an air knife or an air jet assist.

Applicants conducted a series of tests with constant laser conditions and variation of the number of cutting passes per track. In this way, the efficiency of laser cutting could be studied as the kerf develops. FIG. 9 graphically depicts Q* data as a function of the number of passes on a given cutting track. The triangle and circle symbols present the Q* data for 2-ms and 1-ms pulses, respectively, with the air knife processing geometry. The 1-ms pulse provides the most efficient cutting for this setup with up to seven passes with Q* staying less than 20 kJ/g In certain cutting tests, a high speed air jet was arranged to assist in removal of molten material from the kerf. The Q* values for tests employing the air jet assist are also presented in FIG. 9 by the curve comprising the square symbols. The lowest measured value for Q* in steel of 8 kJ/g was observed in the tests with the air jet assist. As the pass number increased, Q* increased due to kerf side wall loses and peak irradiance reduction as the interaction surface receded into the material.

Applicants also conducted cutting studies using non-metallic material coupons. Typically, ten passes on one cutting track were made unless the material penetrated rapidly. Applicants' utilized a 1.0-ms pulse width, 30 Hertz, 174 W average power level.

Figure 10:
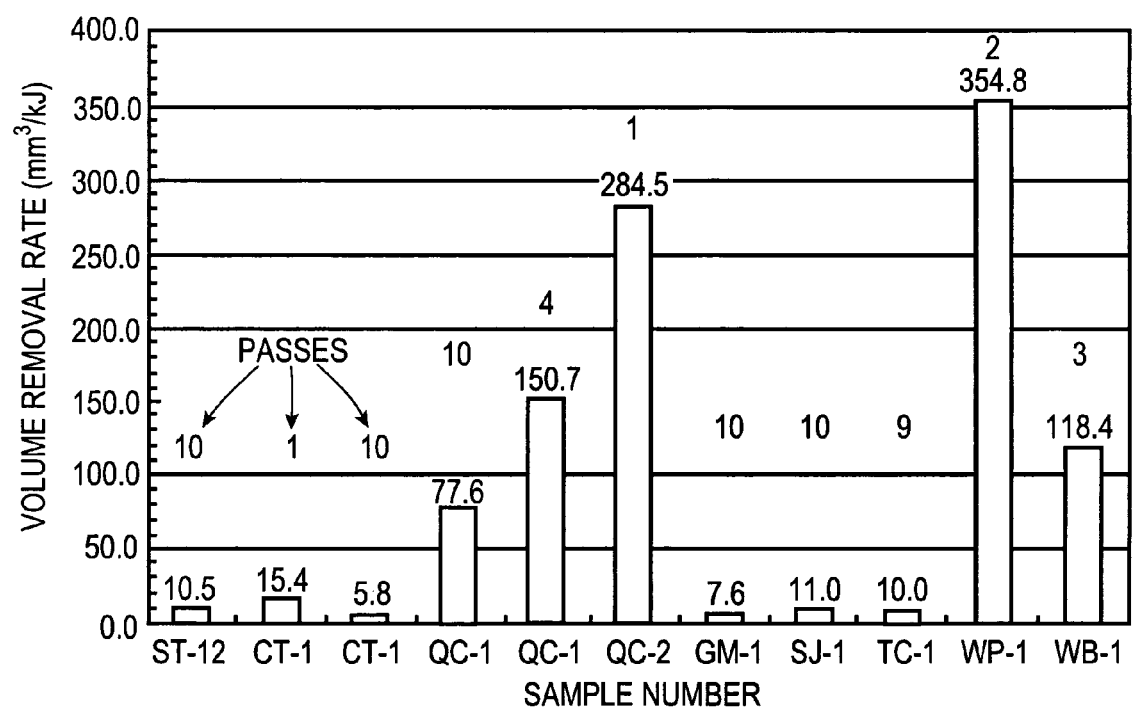
FIG. 10 graphically depicts volumetric removal rates for long pulse laser cutting of various non-metallic substrates.

FIG. 10 graphically depicts the data obtained in Applicants' non-metallic coupon study. The volumetric removal rate was determined by taking the reciprocal of the density times the measured Q* value in appropriate units. For comparison, a typical steel value was 10.5 mm$^3$/kJ for 10 passes.

Referring to FIG. 10, ceramic tile (CT-1) had a slightly better rate than steel for one pass, but the removal rate dropped off rapidly for the ten pass case. For the Quickrete cement sample (QC-1), the volumetric removal rate was quite high but varied with pass number, probably because of the decrease in irradiance as the kerf deepened. Even with this effect, the 10 pass average removal rate for cement was more than seven times that of steel. In tests with granite (GM-1), the removal rate was less than that for steel. Since concrete is typically a combination of cement and rocks, the removal rate for concrete is a function of the fraction of rock material encountered in the specific cut area.

Two other tile materials, slate (SJ-1) and a brick-like terra cotta (TC-1), were cut with the laser and these materials exhibited removal rates similar to steel. The highest removal rate was obtained when cutting poplar wood (WP-1), however considerable smoke was generated and the kerf exhibited side wall charring. Wallboard (WB-I) was also cut relatively easily, but without smoke generation and side wall charring Based upon the studies recited above, Applicants have discovered that long pulse lasers with pulse widths in the 0.5-4.0 ms range efficiently cut C1018 steel with relatively low average power (100-300 W) compared to that normally used for cutting steel with continuous lasers (>1000 W). Moreover, the best cutting efficiency for C1018 steel was obtained with 1.0-ms pulses delivered at 30 Hz (174 W average power) while using a cross flow air jet directed into the kerf to blow the molten material out of the kerf. The scan speed was 10 mm/s. The Q* for the average of the first five passes was 8 kJ/g (15.6 mm$^3$/kJ) and for 20 passes was 19 kJ/g (6.7 mm$^3$/kJ). The increase in Q* with kerf depth was believed to be dominated by the effects of the large beam cone angle, which can be overcome by higher beam quality and better optics. In addition, cutting tests on non-metallic construction materials demonstrated that the laser parameters that work well for cutting steel also will produce good cuts in most other materials.

Figure 11:
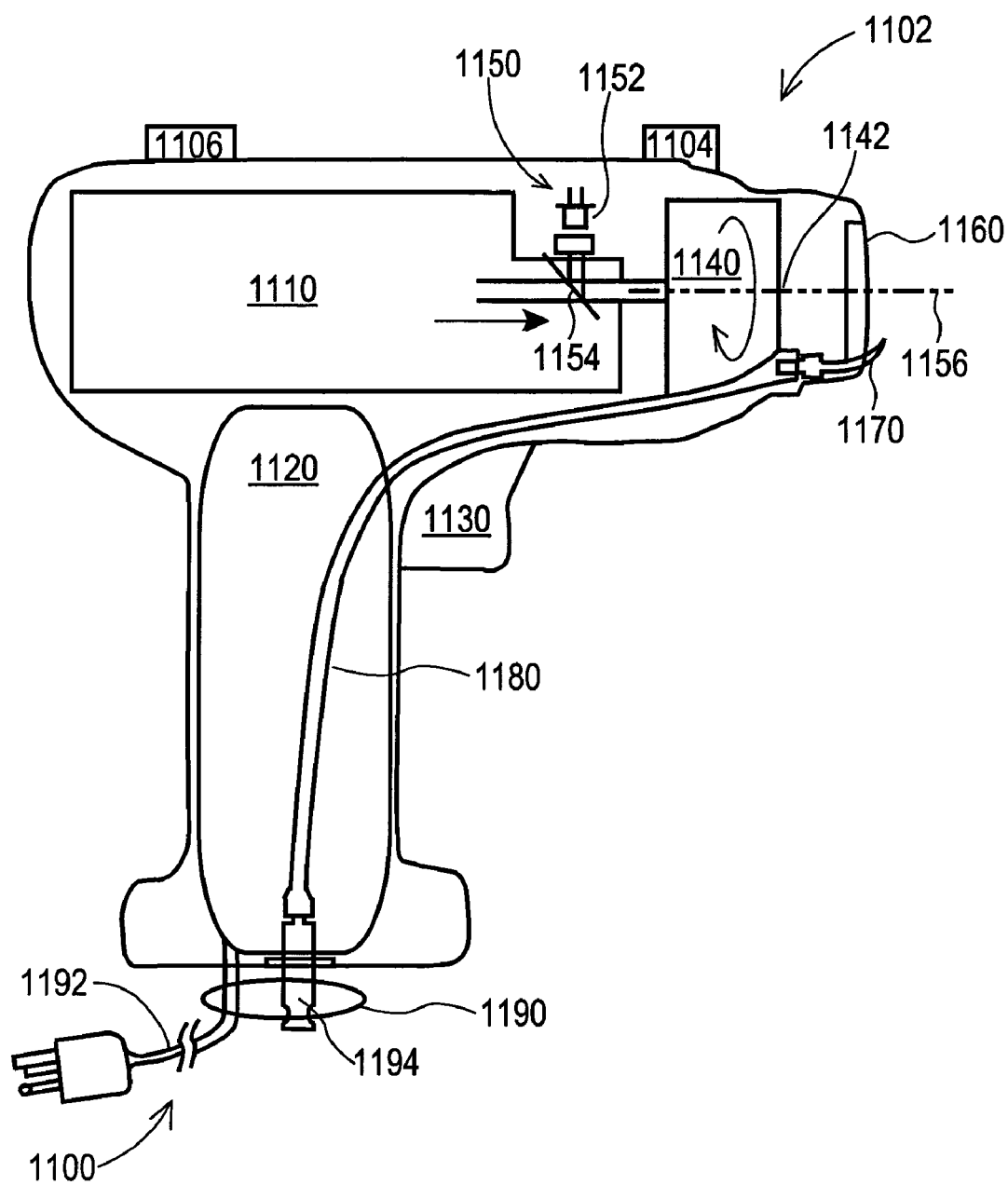
FIG. 11 is a cross-sectional view of one embodiment of Applicants' hand-held laser cutting apparatus.

FIG. 11 illustrates one embodiment of Applicants' hand-held laser cutting apparatus. Referring now to FIG. 11, apparatus 1100 comprises lasing device 1110, power supply and control electronics module 1120, trigger/switch 1130, opto-mechanical trepanning mechanism 1140, aiming device 1150, cover glass 1160, gas/air nozzle 1170, internal gas/air hose 1180, and external conduit 1190 comprising electrical cable 1192 and gas/air hose 1194.

Opto-mechanical trepanning mechanism 1140 is rotatable disposed within output end 1102 of apparatus 1100. Trepanning mechanism 1140 is further illustrated in FIGS. 13 and 14, and is further described hereinbelow.

Figure 12:
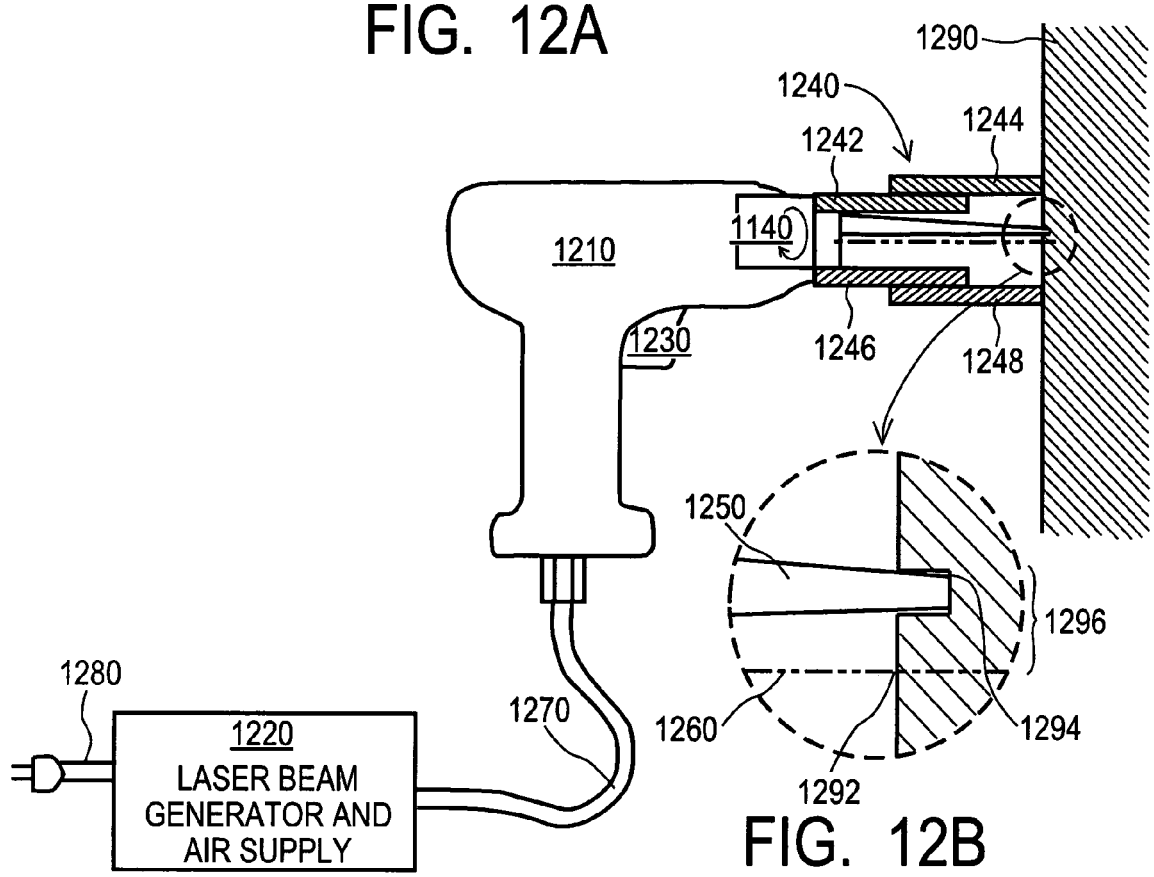
FIG. 12A is a block diagram showing a second embodiment of Applicants' hand-held laser cutting apparatus.
FIG. 12B is a side view showing the offset between the laser beam contact point and the trepanned hole axis on a work piece.
Figure 14A:
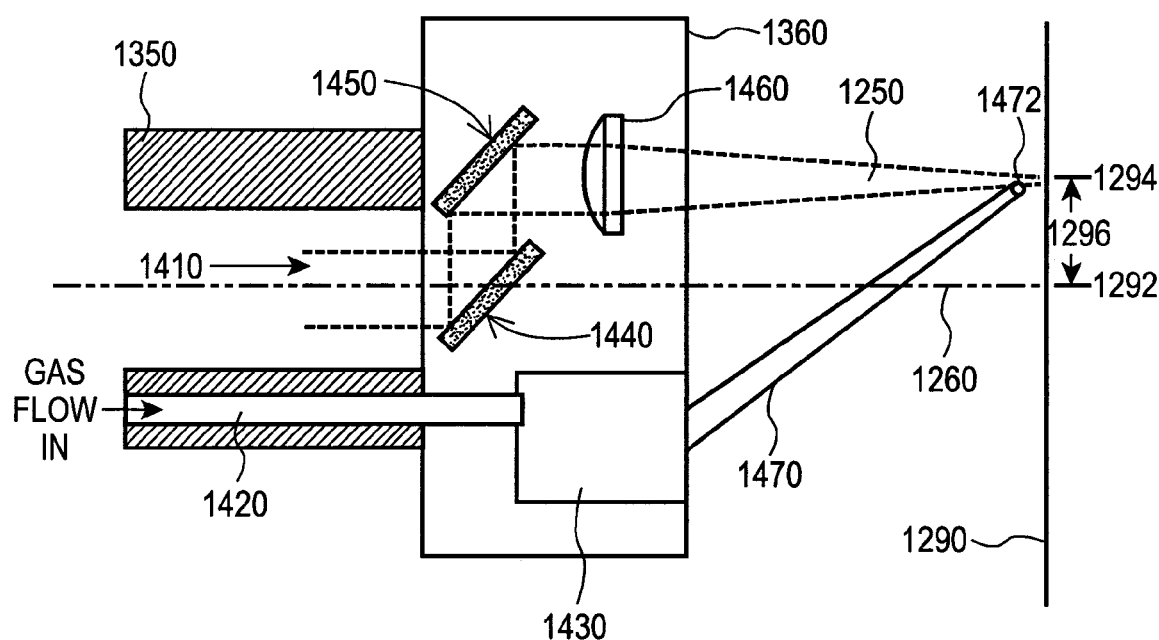
FIG. 14A is a side cross-sectional view of the trepanning head of FIG. 13.

Aiming device 1150 comprises a visible light emitting device 1152 which directs a visible, aiming light onto reflector device 1154. In certain embodiments, visible light emitting device 1152 comprises a low power laser. In other embodiments, visible light emitting device 1152 comprises one or more light emitting diodes. Reflector 1152 directs that aiming light 1156 through trepanning mechanism 1140, and outwardly from end 1102 of apparatus 1100 along the trepanned hole axis 1260 (FIGS. 12B, 14A).

Trigger/switch 1130 comprises a first position and a second position. Trigger/switch 1130 is interconnected with power supply/control module 1120 such that when trigger/switch 1130 is placed in a first position no power is provided by module 1120 to lasing device 1110, and such that when trigger/switch 1130 is placed in a second position power is provided by module 1120 to lasing device 1110. In certain embodiments of apparatus 1100, when trigger/switch 1130 is placed in the second position, power is provided by module 1120 to both lasing device 1110 and visible light emitter 1152. In certain embodiments of apparatus 1100, when trigger/switch 1130 is placed in the second position, power is provided by module 1120 to lasing device 1110, visible light emitter 1152, and to trepanning mechanism 1140.

In certain embodiments, when trigger 1130 is not depressed, power is not provided by module 1120 to lasing device 1110, and when trigger 1130 is depressed, power is provided by module 1120 to lasing device 1110. In certain embodiments, when trigger 1130 is depressed, power is provided by module 1120 to both lasing device 1110 and visible light emitter 1152. In certain embodiments of apparatus 1100, when trigger is depressed, power is provided by module 1120, to lasing device 1110, to visible light emitter 1152, and to trepanning mechanism 1140.

Lasing device 1110 produces a laser beam which is directed through trepanning mechanism 1140, through cover lass 1170, and outwardly from apparatus 1100. In certain embodiments, lasing device 1110 comprises a Nd:YAG laser device or other suitable solid-state laser. In certain embodiments, lasing device 1110 is capable of operating at a maximum average power of up to about 550 Watts, with a pulse width of between 0.5 to about 15 ms, at a repetition rate of between 5 to about 200 Hertz, to deliver pulsed energy of between 2.2 to about 65 Joules. In certain embodiments, lasing device 1110 operates at 1.0 ms pulses delivered at 30 Hz with about 174 W average power. In other embodiments, lasing device 1110 operates at 1.0 ms pulses delivered at 30 Hz with about 300 W average power. In still other embodiments, lasing device 1110 operates at 1.0 ms pulses delivered at 30 Hz with about 1800 W average power.

Applicants' apparatus 1100 comprises a cutting instrument. In certain embodiments, apparatus 1100 operates to cut a circle in a substrate thereby simulating a conventional mechanical hand drill. In these embodiments, when switch/trigger 1130 is placed in the second position, module 1120 provides power and control signals to lasing device 1110, and module 1120 further provides power to trepanning mechanism 1140.

In other embodiments, apparatus 1100 is operated in a linear fashion similar to a jig saw, to cut straight lines, curves, or sharp corners. In these embodiments, the emitted laser beam 1250 (FIGS. 12B, 14A, 14B) does not trepan to make a circular "hole" type cut. In certain of these linear cutting embodiments, the speed of the cut is manually controlled.

In other of these linear cutting embodiments, the power of the laser is controlled to match the speed of the cut. In certain embodiments, apparatus 1100 further comprises velocity sensor 1104, which measures the drill's speed relative to the work piece being cut. In certain embodiments, module 1120 is interconnected with the velocity sensor 1104, and further comprises a feedback loop to provide laser power feedback control for the purpose of yielding a uniform cut. In certain embodiments, apparatus 1100 further comprises visual display device 1106 which provides visual feedback to the user—to aid that user in controlling the travel speed of apparatus 1100.

In certain embodiments, sensor 1104 comprises a mechanical interface to the work piece. In other embodiments, sensor 1104 detects the reflected aiming light 1156 produced by visible light emitting device 1152 and reflected off the work piece. In other embodiments, sensor 1104 detects the YAG light, and uses the cutting laser for speed feedback.

FIG. 12A shows apparatus 1200 wherein a laser beam generating means 1220 is located external to hand piece 1210, and wherein the laser beam is transmitted to the hand piece 1210 via a fiber optic cable 1270. In certain embodiments, cable 1270 comprises laser generating means 1220, wherein the fiber optic is doped with an active lasing species pumped by diode lasers (fiber laser) thereby generating the laser beam within the transmission fiber.

In either case, the laser beam is delivered to the hand piece 1210 by cable 1270. In the illustrated embodiment of FIG. 12A, cable 1270 also provides gas, electrical control signals, and (optionally) electrical power for driving the trepanning head. Apparatus 1200 further comprises assembly 1240 which maintains the hand piece axis on the trepan hole axis while drilling using apparatus 1200.

The laser beam generated by laser beam generator 1220, and transmitted to headpiece 1210 by cable 1270 is provided to trepanning mechanism 1140. The laser beam is directed outwardly from trepanning mechanism 1140, through assembly 1240, and onto work surface 1290.

In the illustrated embodiment of FIG. 12A, assembly 1240 comprises an inner cylinder 1242 extending outwardly from trepanning mechanism 1140, and outer cylinder 1244 extending outwardly from inner cylinder 1242. In the illustrated embodiment of FIG. 12A, inner cylinder 1242 extends into the proximal end 1246 of outer cylinder 1244. In certain embodiments, the distal end of inner cylinder 1242 is slidably disposed within the proximal portion of outer cylinder 1244.

Distal end 1248 of outer cylinder 1240 rests on work piece 1290, and is held steady by spring loading and friction with the surface. The inner cylinder allows the hand piece to advance inwardly as the hole progresses. In certain embodiments, this advance is controlled by operator pressure on inner cylinder 1242 which is spring loaded against the outer cylinder 1244. In other embodiments, inner cylinder 1242 and hand piece 1210 are moved relative to outer cylinder 1244 in response to sensor feedback information on hole depth. Both inner cylinder 1242 and outer cylinder 1244 are formed to include a large fraction of open area to allow gas flow and debris to escape.

FIG. 12B illustrates that the emitted laser beam 1250 contacts work piece 1290 at contact point 1294. Contact point 1294 is offset from trepanned hole axis 1292. As described hereinbelow, trepanning mechanism 1240 translates the incoming laser beam from axis 1260 to a parallel axis. The distance 1296 (FIGS. 12B, 14A) between trepanned hole axis 1292 and contact point 1294 corresponds to the radius of the hole being formed.

Figure 13:
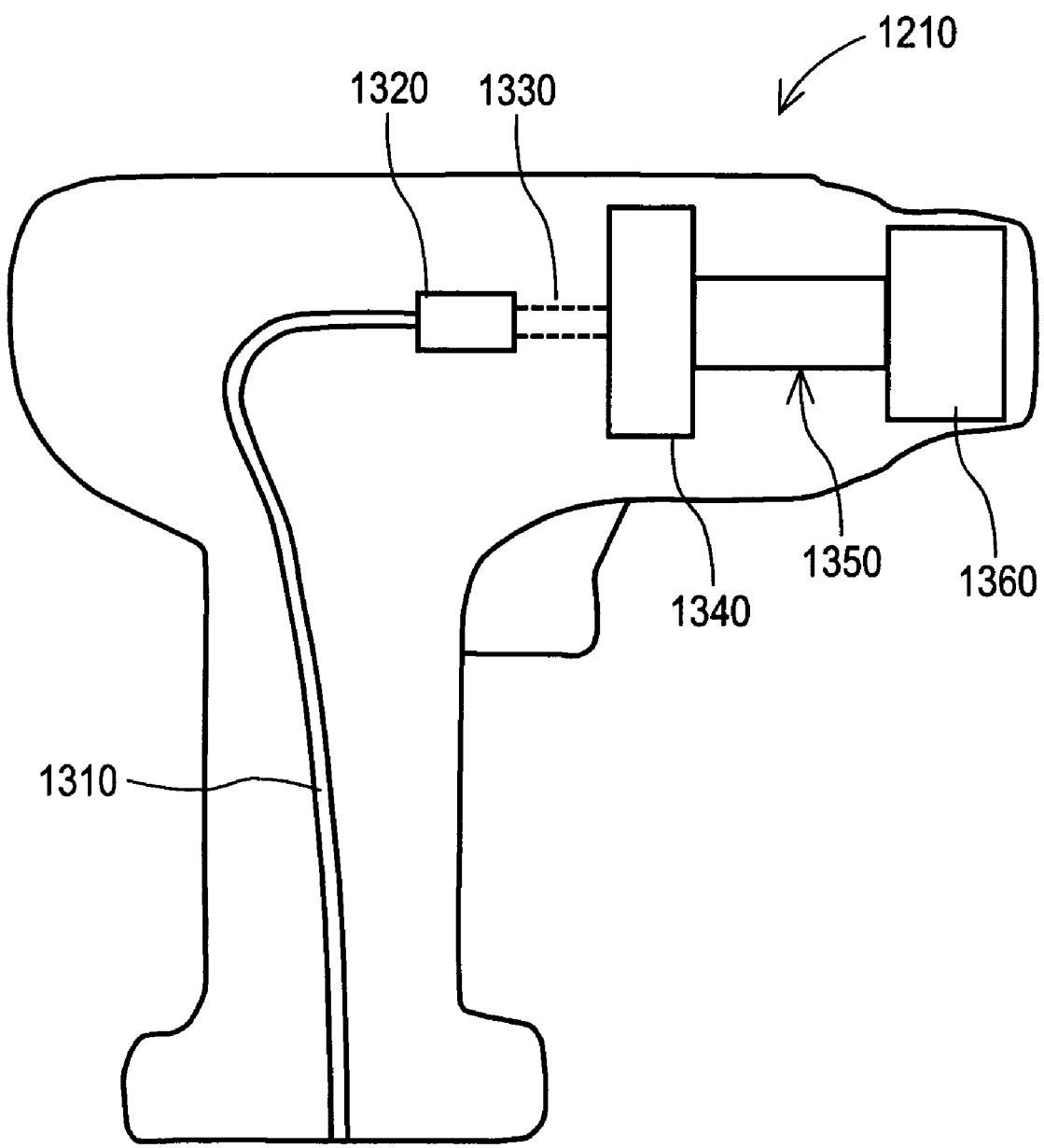
FIG. 13 is a cross-sectional view of one embodiment of Applicants' trepanning mechanism which includes a trepanning head, a drive shaft, and a drive unit.

FIG. 13 illustrates one embodiment for transmitting to the trepanning mechanism 1140 (FIGS. 11, 12A) the laser beam generated in device 1220 (FIG. 12A), and transmitted to hand piece 1210 (FIG. 12A) by cable 1270 (FIG. 12A). Referring now to FIG. 13, fiber optic cable 1310 transmits the laser beam 1330 from external cable 1270 to fiber optic collimator 1320. Fiber optic collimator 1320 is aligned with the axis of the trepanning head 1360, and transmits a collimated beam down axis 1260. Trepanning head 1360 is rotated by hollow shaft 1350 which is driven by mechanism 1340. In certain embodiments, drive mechanism 1340 comprises an electric motor armature. In other embodiments, drive mechanism 1340 comprises a turbine driven by gas flow.

Figure 14B:
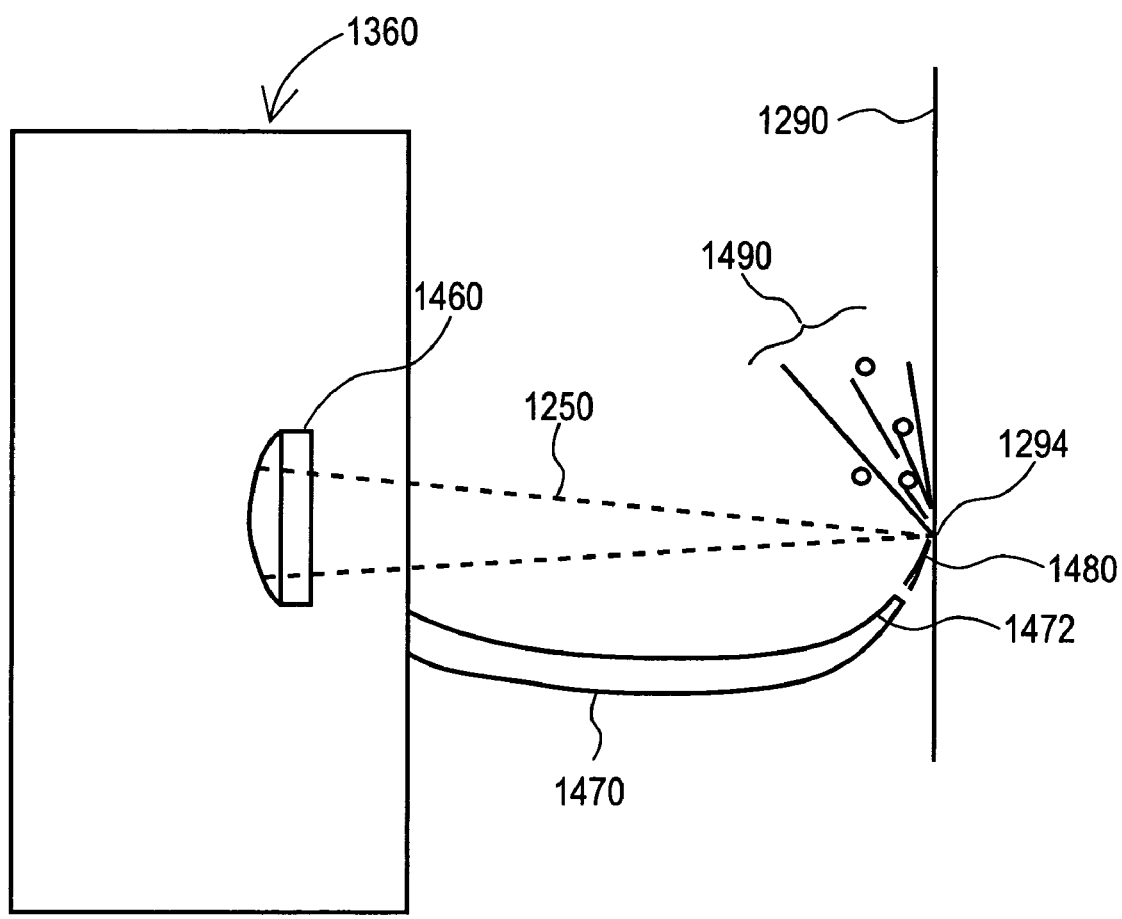
FIG. 14B is a top cross-sectional view of the trepanning head of FIG. 13.

FIGS. 14A and 14B show a side view and a top view, respectively, of one embodiment of Applicants' trepanning head 1360. Referring now to FIG. 14A, laser beam 1410 passes through hollow shaft 1350 into trepanning head 1360, that laser beam being aligned with trepanning axis 1260 (FIG. 12B). Laser beam 1410 is translated to a parallel position off axis 1260 such that the axis of the translated beam is located a distance 1296 from axis 1260, where that distance 1296 corresponds to the desired drill-hole radius as shown.

In the illustrated embodiment of FIG. 14A, the translation of incoming beam 1410 is performed by a pair of mirrors 1440 and 1450. In these embodiments, incoming beam 1410 on a first axis is directed onto mirror 1440, reflected from mirror 1440 onto mirror 1450; and directed from mirror 1450 on a second axis, where the first axis differs from the second axis.

In other embodiments, this translation of incoming beam 1410 is performed with a prism, or a pair of prisms. The translated beam is then focused with lens 1460 to a waist at contact point 1294 on the work surface 1290. The distance 1296 between the contact point 1294 and trepanning axis 1260 corresponds to the radius of the hole being cut.

Referring now to FIGS. 14A and 14B, for the most effective removal of material 1490 from the kerf, a gas jet 1480 is directed at the contact point 1294 in a circumferential direction as trepanning head 1360 rotates. In certain embodiments, Applicants' hollow shaft 1350 comprises gas inlet conduit 1420 which communicates with gas plenum 1430. Gas conduit 1470 communicates with gas plenum 1430 and extends outwardly therefrom toward work surface 1290. Conduit 1470 comprises nozzle 1472 at its distal end. Gas 1480 is released from nozzle 1472 and clears material 1490 from the kerf as that kerf is formed. Applicants' have found that such a rotating gas nozzle is particularly useful for efficient steel drilling where the molten steel must be blown out of the kerf as it is melted by the laser beam.

As those skilled in the art will appreciate, in order to provide gas jet 1480, a gas source is provided, where that gas source provides to one or more gasses from the gas source to nozzle 1170 (FIG. 11)/1472 (FIGS. 14A, 14B) via external gas conduit 1194 (FIG. 11)/1270 (FIG. 12), internal gas conduit 1180 (FIG. 11), and optionally gas plenum 1430 (FIG. 14A). By "gas," Applicants mean a non-flammable gaseous composition. In certain embodiments, that gaseous composition comprises compressed air, helium, nitrogen, argon, xenon, oxygen, and combinations thereof.

While the preferred embodiments of the present invention have been illustrated in detail, it should be apparent that modifications and adaptations to those embodiments may occur to one skilled in the art without departing from the scope of the present invention as set forth in the following claims.

We claim:

1. A hand-held apparatus for material fabrication, comprising:
    a hand piece having an output end;
    a switch disposed on said hand piece, having an on position and an off position;
    wherein a laser beam is directed outwardly from said output end of said hand piece when said switch is disposed in said on position;
    a trepanning mechanism rotatably disposed within said hand piece and comprising a rotatable trepanning head comprising a gas plenum, a drive mechanism, and a rotatable hollow shaft comprising an internal gas conduit and interconnecting said trepanning head and said drive mechanism, wherein said drive mechanism rotates said hollow shaft, and wherein said laser beam passes through said drive mechanism and through said hollow shaft and enters said trepanning head on a first axis and is directly outwardly from said trepanning head on a second axis;
    a rotatable external gas conduit in communication with said gas plenum and extending outwardly from said trepanning head and through said output end, wherein a distal end of said gas conduit comprises a nozzle;
    wherein said nozzle is configured such that a gas jet comprising a gas exiting from said nozzle is directed at said laser beam.

2. The apparatus of claim 1, further comprising:
    a lasing device external to said hand piece; and
    a fiber optic cable interconnecting said external lasing device and said hand piece, wherein said lasing device produces a laser beam, and wherein said fiber optic cable transmits said laser beam to said hand piece.

3. The apparatus of claim 2, wherein said fiber optic comprises an active lasing medium pumped by said external lasing device.

4. The apparatus of claim 1, further comprising a lasing device disposed within said hand piece.

5. The apparatus of claim 4, wherein said lasing device comprises a rare-earth ion doped solid-state laser.

6. The apparatus of claim 5, wherein said rare-earth ion-doped solid state laser comprises a Nd:YAG laser.

7. The apparatus of claim 6, wherein said Nd:YAG laser is capable of operating at pulse widths in the 0.5-4.0 ms range at an average power levels of 100 to 300 Watts.

8. The apparatus of claim 7, wherein said Nd:YAG laser is capable of operating at about 1-ms pulses at an average power level of about 174 Watts.

9. The apparatus of claim 5, further comprising:
    a power supply disposed within said hand piece and interconnected to said lasing device.

10. The apparatus of claim 1, wherein said first axis is parallel to said second axis.

11. The apparatus of claim 1, wherein said trepanning head comprises a first mirror and a second mirror.

12. The apparatus of claim 1, wherein said trepanning head comprises a prism.

13. The apparatus of claim 1, wherein said trepanning head comprises a lens.

* * * * *